Nov. 9, 1954 K. JOCHEM 2,693,715
REMOTE GEAR CONTROL FOR MOTOR VEHICLES
Filed Dec. 3, 1951 2 Sheets-Sheet 1
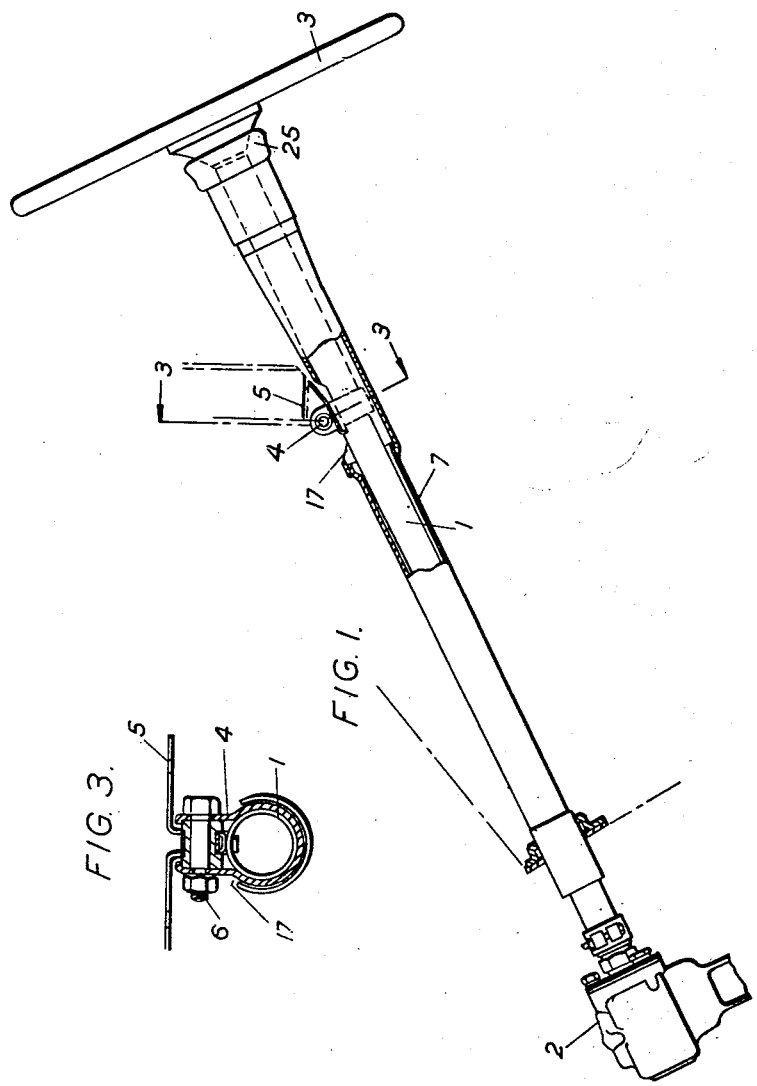
Inventor
Karl Jochem
By
Willits Helming Baillio
Attorney Nov. 9, 1954    K. JOCHEM    2,693,715
REMOTE GEAR CONTROL FOR MOTOR VEHICLES
Filed Dec. 3, 1951    2 Sheets-Sheet 2
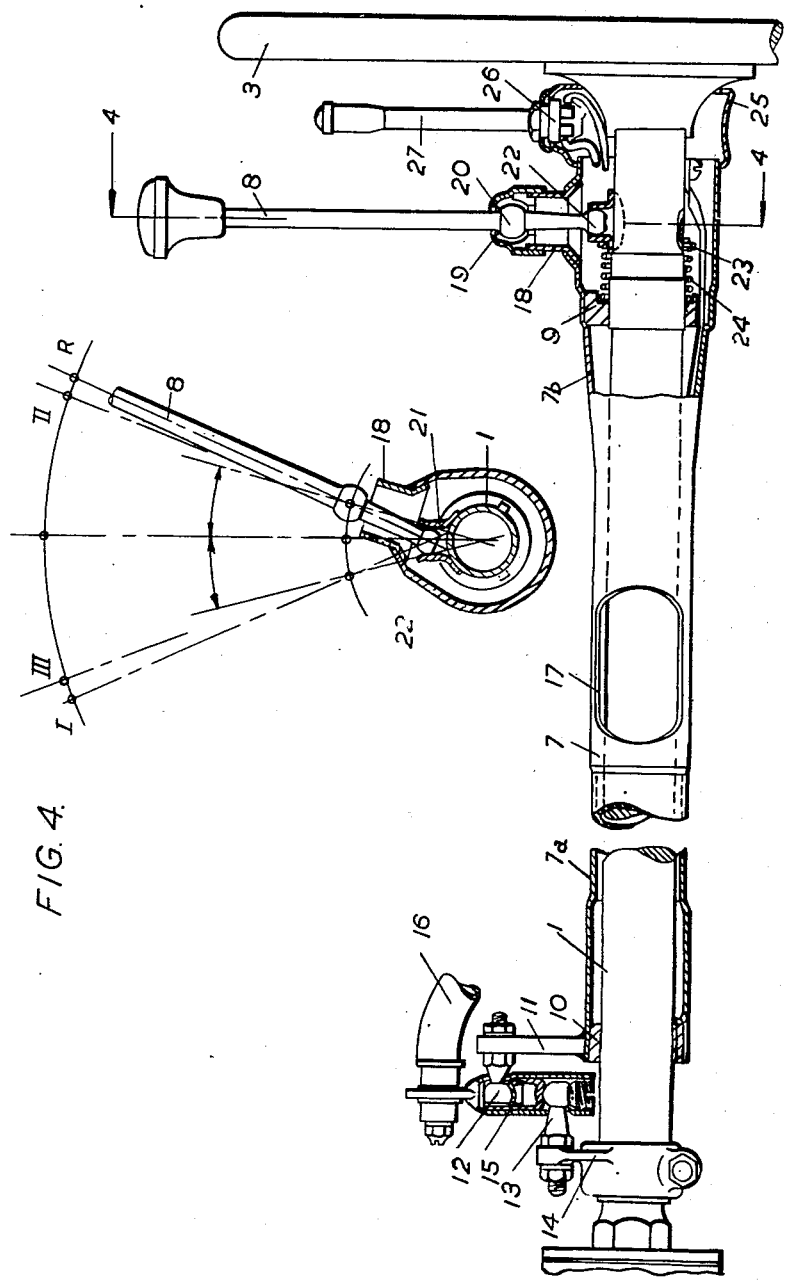
Inventor
Karl Jochem
By Willits, Helming & Baillio
Attorney

United States Patent Office 2,693,715
Patented Nov. 9, 1954

2,693,715

REMOTE GEAR CONTROL FOR MOTOR VEHICLES

Karl Jochem, Russelsheim am Main, Germany, assignor to General Motors Corporation, Detroit, Mich., a corporation of Delaware Application December 3, 1951, Serial No. 259,619

Claims priority, application Germany December 27, 1950

15 Claims. (Cl. 74—484)

This invention relates to gear-shaft mechanisms for motor vehicles.

It is particularly concerned with such mechanisms in which the hand lever is arranged below the steering wheel and its movements are transmitted by means of a gear-shift rod to a control rod which is pivotally connected to the lower end of the gear-shift rod.

According to the present invention the gear-shift rod is a tube which encloses the steering column and is capable of rotation and axial displacement.

The scope of the invention is defined by the appended claims and how it can be carried into effect will be apparent from the following description with reference to the accompanying drawings in which a preferred embodiment of the invention is illustrated, and in which:

Figure 1 is a side elevation in part section, of a steering and gear-shift column constructed according to this invention;

Figure 2 is a plan in part section of the same, on somewhat larger scale;

Figure 3 is a section on line 3—3 in Figure 1; and

Figure 4 a section on line 4—4 in Figure 2.

The stationary steering column 1, has its lower end attached to the casing 2 of steering gear mechanism secured to the chassis, and it surrounds the steering shaft (not shown) which connects the steering gear mechanism. The top attachment of the steering column 1 is to the dashboard and consists of a clip (Figure 3) 4 placed round the steering column 1 and a support 5 attached to the dashboard, the clip 4 and the support 5 being joined together by a bolt 6. A gear-shift tube 7 surrounds the steering column 1 concentrically and is mounted thereon so as to be capable of rotation and of axial displacement under the control of a manually operable lever 8, this being made possible by means of an upper bearing 9 and a lower bearing 10 within the tube 7 and slidable on the column 1.

The gear-shift tube 7 comprises a lower section 7a, and an upper section 7b which gradually increases in diameter towards the steering wheel 3, either gradually or in steps, or in both ways as shown, the two tubular sections being joined together by welding. Welded onto the bottom end of the shift tube 7 is an arm 11 on the end of which is carried a ball pivot 12. A similar ball pivot 13 is carried on a fixed support 14 fastened to the steering column 1. The ball pivots 12 and 13 form, together with the sleeve link 15 uniting them, an articulated linkage which transmits the movements from the shift tube 7 to an interconnection to the speed-change mechanism (not shown) on the gear box, comprising a control rod 16 secured to the link 15.

Adjacent the supports 4, 5 of the steering column 1, the gear-shift tube 7 has an opening 17 of such proportions that neither the axial displacement of the shift-tube 7 necessary for preselecting the gear-speed group nor its rotary movement necessary for engaging the desired speed, are impeded by the clip 4.

The upper end of the shift tube 7 has a lateral tubular attachment 18 (Figure 2) which carries a screw cap a bearing 19 for the manually operable gear lever 8 which has a spherical boss 20 fitting in the bearing 19. The steering column 1 has a tubular attachment 21 into which the spherical end 22 of the gear lever 8 fits. A helical compression spring 24 is located on the column 1 between the upper bearing 9 and a collar 23; and in the free position this spring brings the gear-shift tube 7 and the hand lever 8 back into the preselection position shown for the selecting either second (II) or third (III) speed (Figure 4). If the hand lever 8 is moved upwardly towards the steering wheel 3 (that is clockwise in Figure 2) out of the indicated position corresponding that preselection position for the second and third speeds, into the position for preselecting the other speed group, say for the first speed (I) and reverse (R), the shift tube 7 is thereby pushed axially upwards, and link 15 is pivoted counterclockwise (Figure 2) about pivot 13. The engaging of the desired gear speed is effected from either preselected position by swinging the hand lever 8 about the steering column, that is in the plane of Figure 4, which shows the lever 8 in the reverse (R) position. The shift tube 7 thereby rotates about its longitudinal axis and link 15 rocks about a parallel axis on pivot 13.

A switch 26 with a switch lever 27 for actuating the direction indicator (not shown) is fastened on a collar 25 likewise secured to the steering column 1.

I claim:

1. Gear-shift mechanism for a motor vehicle having a steering column and a steering wheel mounted at the top thereof, comprising a manually operable lever universally mounted at a fixed point on said column and adapted to move towards and away from said steering wheel for preselective movements and to move parallel to the plane of said steering wheel for gear-engagement movements, a shaft mounted on said steering column and connected to said lever and movable axially and rotatably consequent upon said preselective and gear-engagement movements respectively, means adjacent the bottom end of said steering shaft for connecting said shaft to the gearing, said shaft being tubular and coaxial with said steering column.

2. Gear-shift mechanism for a motor vehicle having a steering column and a steering wheel mounted at the top thereof, comprising a manually operable lever universally mounted at a fixed point on said column and adapted to move towards and away from said steering wheel for preselective movements and to move parallel to the plane of said steering wheel for gear-engagement movements, a shaft mounted on said steering column bearings between said shaft and said column, said shaft being connected to said lever and movable axially and rotatably on said bearings consequent upon said preselective and gear-engagement movements respectively, means adjacent the bottom end of said steering shaft for connecting said shaft to the gearing, said shaft being tubular and coaxial with said steering column.

3. Gear-shift mechanism for a motor vehicle having a steering column, a bracket supporting said column, and a steering wheel mounted at the top of said column, comprising a manually operable lever universally mounted at a fixed point on said column and adapted to move towards and away from said steering wheel for preselective movements and to move parallel to the plane of said steering wheel for gear-engagement movements, a tubular shaft mounted externally on said steering column and connected to said lever and movable axially and rotatably consequent upon said preselective and gear-engagement movements respectively, means adjacent the bottom end of said steering shaft for connecting said shaft to the gearing, bearings between said shaft and said column, said shaft being tubular and coaxial with said steering column and having an aperture in which said bracket is located so as to allow said axial and rotatable movements.

4. Gear-shift mechanism for a motor vehicle having a steering column, a bracket supporting said column, and a steering wheel mounted at the top of said column, comprising a manually operable lever universally mounted at a fixed point on said column and adapted to move towards and away from said steering wheel for preselective movements and to move parallel to the plane of said steering wheel for gear-engagement movements, a tubular shaft mounted externally on said steering column, bearings between said shaft and said column, said shaft being connected to said lever and movable axially and rotatably on said bearings consequent upon said preselective and gear-engagement movements respectively, means adjacent the bottom end of said steering shaft for connecting said shaft to the gearing, said shaft being tubular and coaxial with said steering column and having an aperture in which said bracket is located so as to allow said axial and rotatable movements.

5. Gear-shift mechanism for a motor vehicle having a steering column and a steering wheel mounted at the top thereof, comprising a manually operable lever universally mounted at a fixed point on said column and adapted to move towards and away from said steering wheel for preselective movements and to move parallel to the plane of said steering wheel for gear-engagement movements, a shaft mounted on said steering column and connected to said lever and movable axially and rotatably consequent upon said preselective and gear-engagement movements respectively, means adjacent the bottom end of said steering shaft for connecting said shaft to the gearing, said shaft being tubular and coaxial with said steering column, and spring means biasing said shaft to a preselective position.

6. Gear-shift mechanism for a motor vehicle having a steering column and a steering wheel mounted at the top thereof, comprising a manually operable lever pivotally mounted on said column and adapted to move towards and away from said steering wheel for preselective movements and to move parallel to the plane of said steering wheel for gear-engagement movements, a shaft mounted on said steering column and having a tubular attachment and a spherical bearing in said attachment, said lever having a spherical boss fitting in said spherical bearing for pivotal movement relative to said shaft during said preselective and gear-engagement movements to effect axial and rotatable movement of said shaft respectively, means adjacent the bottom end of said steering shaft for connecting said shaft to the gearing, said shaft being tubular and coaxial with said steering column, and spring means biasing said shaft to a preselective position.

7. Gear-shift mechanism for a motor vehicle comprising a column, a manually operable lever mounted on said column and movable about two intersecting axes at right angles to one another, a tubular shaft connected to said lever and surrounding and movable around and longitudinally of said column consequent to movements of said lever about said two axes respectively, and means at another part of said shaft for effecting gear shifts in accordance with said movement.

8. Gear-shift mechanism for a motor vehicle comprising a column, a manually operable lever mounted on said column and movable about two intersecting axes at right angles to one another, a tubular shaft pivotally connected to said lever and surrounding and movable around and longitudinally of said column consequent to movements of said lever about said two axes, means at another part of said shaft for effecting gear shifts in accordance with said movements, and spring means biasing said shaft longitudinally of the column.

9. Gear-shift mechanism for a motor vehicle comprising a column, a fixed bracket supporting said column, a manually operable lever mounted on said column and movable about two intersecting axes at right angles to one another, a tubular shaft pivotally connected to said lever and surrounding and movable around and longitudinally of said column consequent to movements of said lever about said two axes respectively said shaft having an aperture through which said bracket passes, and means at another part of said shaft for effecting gear shifts in accordance with said movements.

10. Gear-shift mechanism for a motor vehicle comprising a column, a manually operable lever mounted on said column and movable about two intersecting axes at right angles to one another, a tubular shaft pivotally connected to said lever and surrounding and movable around and longitudinally of said column consequent to movements of said lever about said two axes respectively bearings between said shaft and said column and means at another part of said shaft for effecting gear shifts in accordance with said movements.

11. Gear-shift mechanism for a motor vehicle comprising a column, a manually operable lever mounted on said column and movable about two intersecting axes at right angles to one another, a tubular shaft connected to said lever and surrounding and movable around and longitudinally of said column consequent to movements of said lever about said two axes respectively, bearings between said shaft and said column means at another part of said shaft for effecting gear shifts in accordance with said movements, and spring means biasing said shaft longitudinally of said column.

12. Gear-shift mechanism for a motor vehicle comprising a column, a bracket supporting said column, a manually operable lever mounted on said column and below said steering wheel and movable about two intersecting axes at right angles to one another, a tubular shaft pivotally connected to said lever and surrounding and movable around and longitudinally of said column consequent to movements of said lever about said two axes respectively, bearings between said shaft and said column, said shaft having an aperture through which said bracket passes, means at another part of said shaft for effecting gear shifts in accordance with said movements, and spring means biasing said shaft longitudinally of said column.

13. In a remote control mechanism, a supporting column, a control tube surrounding said supporting column and mounted on said supporting column for rotary and longitudinal movement, a control lever pivotally mounted at a fixed point on said supporting column for movement in transverse planes, and means connecting said control lever to said control tube to rotate said control tube when the said control lever is moved in one plane and to longitudinally move said control tube when said control lever is moved in a plane transverse to said one plane.

14. In a remote control mechanism, a supporting column, a control tube surrounding said supporting column and mounted on said supporting column for rotary and longitudinal movement, a control lever pivotally mounted at a fixed point on said supporting column for movement in transverse planes, means connecting said control lever to said control tube to rotate said control tube when the said control lever is moved in one plane and to longitudinally move said control tube when said control lever is moved in a plane transverse to said one plane, a controlled lever pivoted to said supporting column at a point remote from said fixed point, and means interconnecting said control tube and said controlled lever to move said controlled lever in two transverse planes.

15. In a remote control mechanism, a supporting column, a control tube surrounding and rotatably and longitudinally movable mounted on said supporting column, a lever means interconnecting said supporting column and a part of said control tube to rotatably and longitudinally move said control tube, a generally radially outwardly extending member fixed to another part of said control tube, a strut universally pivoted at one end to said supporting column and intermediate its ends to said member, and a control link fixed to the other end of said strut.

References Cited in the file of this patent

UNITED STATES PATENTS

| Number | Name | Date |
|---|---|---|
| 2,284,246 | Baade | May 26, 1942 |
| 2,377,700 | Kurtz | June 5, 1945 |
| 2,420,333 | Wharam | May 13, 1947 |
| 2,455,204 | Wharam | Nov. 30, 1948 |
| 2,504,285 | Wahlberg | Apr. 18, 1950 |
| 2,532,170 | Jovanovich | Nov. 28, 1950 |